United States Patent
Noh et al.

(10) Patent No.: US 9,847,866 B2
(45) Date of Patent: Dec. 19, 2017

(54) METHOD AND APPARATUS FOR TRANSMITTING/RECEIVING SIGNAL IN WIRELESS ACCESS SYSTEM WHICH SUPPORTS FDR TRANSMISSION

(71) Applicant: LG ELECTRONICS INC., Seoul (KR)

(72) Inventors: Kwangseok Noh, Seoul (KR); Jinmin Kim, Seoul (KR); Kukheon Choi, Seoul (KR); Jaehoon Chung, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 14/893,491

(22) PCT Filed: Jun. 11, 2014

(86) PCT No.: PCT/KR2014/005118
§ 371 (c)(1),
(2) Date: Nov. 23, 2015

(87) PCT Pub. No.: WO2014/200262
PCT Pub. Date: Dec. 18, 2014

(65) Prior Publication Data
US 2016/0099802 A1 Apr. 7, 2016

Related U.S. Application Data

(60) Provisional application No. 61/833,452, filed on Jun. 11, 2013.

(51) Int. Cl.
*H04L 5/14* (2006.01)
*H04W 72/04* (2009.01)
(Continued)

(52) U.S. Cl.
CPC .............. *H04L 5/14* (2013.01); *H04B 7/26* (2013.01); *H04L 5/005* (2013.01); *H04L 5/0053* (2013.01);
(Continued)

(58) Field of Classification Search
CPC .. H04W 72/042; H04W 72/0406; H04L 5/14; H04L 5/005; H04L 5/0091; H04L 5/0044;
(Continued)

(56) References Cited

U.S. PATENT DOCUMENTS 8,811,240 B2 * 8/2014 Chindapol ............ H04L 5/0007
370/281
9,264,205 B2 * 2/2016 Celebi ................... H04L 5/0085
(Continued)

OTHER PUBLICATIONS

PCT International Application No. PCT/KR2014/005118, Written Opinion of the International Searching Authority dated Sep. 18, 2014, 11 pages.
(Continued)

*Primary Examiner* — Afsar M Qureshi
(74) *Attorney, Agent, or Firm* — Lee Hong Degerman Kang & Waimey

(57) ABSTRACT

The present invention relates a wireless access system which supports a full duplex radio (FDR) transmission environment. A method for receiving a signal from a base station by a terminal in the wireless access system which supports FDR transmission according to an embodiment of the present invention comprises the steps of: receiving, from the base station, reference signal mode information indicating resources by which a reference signal is transmitted, from among reference signal available resources by which the reference signal can be transmitted; receiving, from the base station, additional resource mode information indicating additional data resources by which a terminal can simultaneously transmit data, from among the resources by which
(Continued)

the reference signal is transmitted; and transmitting the data using the additional resource mode information simultaneously while receiving the reference signal using the reference signal mode information.

14 Claims, 25 Drawing Sheets

(51) Int. Cl.
  *H04B 7/26* (2006.01)
  *H04L 5/00* (2006.01)
(52) U.S. Cl.
  CPC ......... *H04L 5/0091* (2013.01); *H04W 72/042* (2013.01); *H04L 5/0044* (2013.01)
(58) Field of Classification Search
  CPC ....... H04L 5/1461; H04L 5/16; H04L 5/0446; H04L 5/0453; H04L 5/048; H04L 5/0413; H04L 5/082; H04B 7/26; H04B 1/525
  USPC .................................................. 370/277, 329
  See application file for complete search history.

(56) References Cited

U.S. PATENT DOCUMENTS

| | | |
|---|---|---|
| 2009/0268645 A1 | 10/2009 | Chindapol et al. |
| 2011/0044250 A1* | 2/2011 | Han .................... H04B 7/0689 370/328 |
| 2011/0044391 A1* | 2/2011 | Ji .......................... H04L 5/0007 375/260 |
| 2012/0033603 A1* | 2/2012 | Seo ........................ H04L 5/001 370/312 |
| 2012/0039282 A1 | 2/2012 | Kim et al. |
| 2012/0201153 A1 | 8/2012 | Bharadia et al. |
| 2013/0040673 A1 | 2/2013 | Siomina et al. |
| 2013/0114468 A1 | 5/2013 | Hui et al. |

OTHER PUBLICATIONS

European Patent Office Application Serial No. 14810728.7, Search Report dated Dec. 15, 2016, 10 pages.

Goyal et al., "Analyzing a full-duplex cellular system", 47th Annual Conference on Information Sciences and Systems (CISS), IEEE, Mar. 20, 2013, 6 pages.

* cited by examiner

FIG. 5
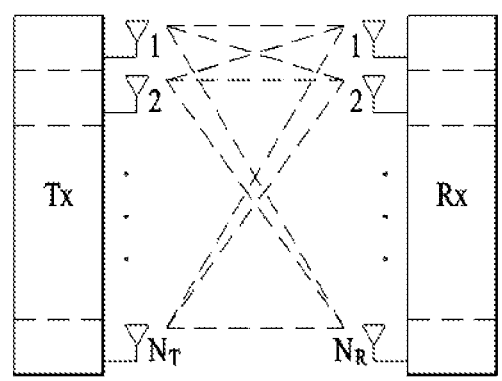
(a)
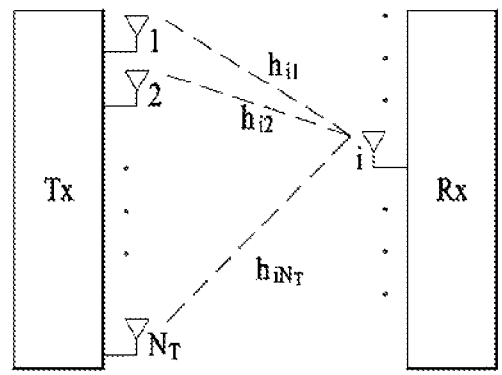
(b)

FIG. 9

METHOD AND APPARATUS FOR TRANSMITTING/RECEIVING SIGNAL IN WIRELESS ACCESS SYSTEM WHICH SUPPORTS FDR TRANSMISSION

CROSS-REFERENCE TO RELATED APPLICATIONS

This application is the National Stage filing under 35 U.S.C. 371 of International Application No. PCT/KR2014/005118, filed on Jun. 11, 2014, which claims the benefit of U.S. Provisional Application No. 61/833,452, filed on Jun. 11, 2013, the contents of which are all hereby incorporated by reference herein in their entirety.

TECHNICAL FIELD

The present invention relates to a wireless access system supporting a Full Duplex Radio (FDR) transmission environment and, more particularly, to a method for efficiently transmitting and receiving a signal when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide methods for efficiently transmitting and receiving a signal in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solution

According to an aspect of the present invention devised to solve the above problems, a method for receiving a signal from a Base Station (BS) by a User Equipment (UE) in a wireless access system supporting Full Duplex Radio (FDR) transmission includes receiving reference signal mode information indicating resources on which a reference signal is transmitted among available reference signal resources on which the reference signal is capable of being transmitted from the BS; receiving additional resource mode information indicating additional data resources on which the UE is capable of transmitting data among the resources on which the reference signal is transmitted; and receiving the reference signal using the reference signal mode information and simultaneously transmitting the data using the additional resource mode information.

According to another aspect of the present invention, a User Equipment (UE) for receiving a signal from a Base Station (BS) in a wireless access system supporting Full Duplex Radio (FDR) transmission includes a Radio Frequency (RF) unit and a processor, wherein the processor is configured to receive reference signal mode information indicating resources on which a reference signal is transmitted among available reference signal resources on which the reference signal is capable of being transmitted from the BS, receive additional resource mode information indicating additional data resources on which the UE is capable of transmitting data among the resources on which the reference signal is transmitted, and receive the reference signal using the reference signal mode information and simultaneously transmit the data using the additional resource mode information.

The following may be commonly applied to the aspects of the present invention.

The reference signal mode information may include information indicating any one of a first mode for allocating the reference signal to all of the available reference signal resources; a second mode for allocating the reference signal to part of the available reference signal resources; a third mode for allocating the reference signal to resources except for resources for the second mode among the available reference signal resources; and a fourth mode for not allocating the reference signal to all of the available reference signal resources.

The additional resource mode information may include information indicating any one of a first mode for not allocating the additional data resources to all of the available reference signal resources, a second mode for allocating the additional data resources to part of the available reference signal resources, a third mode for allocating the additional data resources to resources except for resources for the second mode among the available reference signal resources, and a fourth mode for allocating the additional data resources to all of the available reference signal resources.

The sum of the resources on which the reference signal is transmitted according to the reference signal mode information and the additional data resources according to the additional resource mode information may constitute the available reference signal resources.

The reference signal mode information may be transmitted in every Transmit Time Interval (TTI).

The reference signal mode information may be transmitted in every Transmit Time Interval (TTI) of a reference value.

The reference signal mode information may be transmitted through a downlink control channel.

The foregoing general description and following detailed description of the present invention are exemplary and explanatory and are intended to provide further explanation of the invention claimed.

Advantageous Effects

According to embodiments of the present invention, the following effects can be obtained.

First, a signal can be efficiently transmitted and received in a wireless access system in a wireless access system supporting FDR transmission.

Effects according to the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

DESCRIPTION OF DRAWINGS

FIG. 5 illustrates the structure of a downlink radio frame used in an LTE system.

FIGS. 8 and 9 illustrate periodic reporting of channel state information.

BEST MODE

Figure 1:
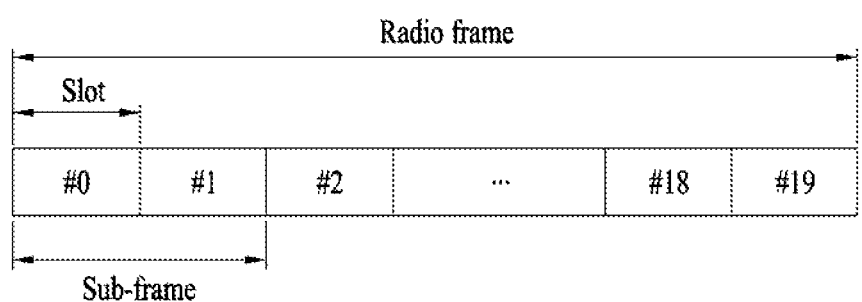
FIG. 1 illustrates a network structure of an E-UMTS as an exemplary wireless communication system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram illustrating the structure of the type 1 radio frame. A downlink radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

In case of a normal CP, since one slot includes seven OFDM symbols, one subframe includes 14 OFDM symbols.

The first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in a radio frame, the number of slots included in a subframe or the number of symbols included in a slot may be changed in various manners.

Figure 2:
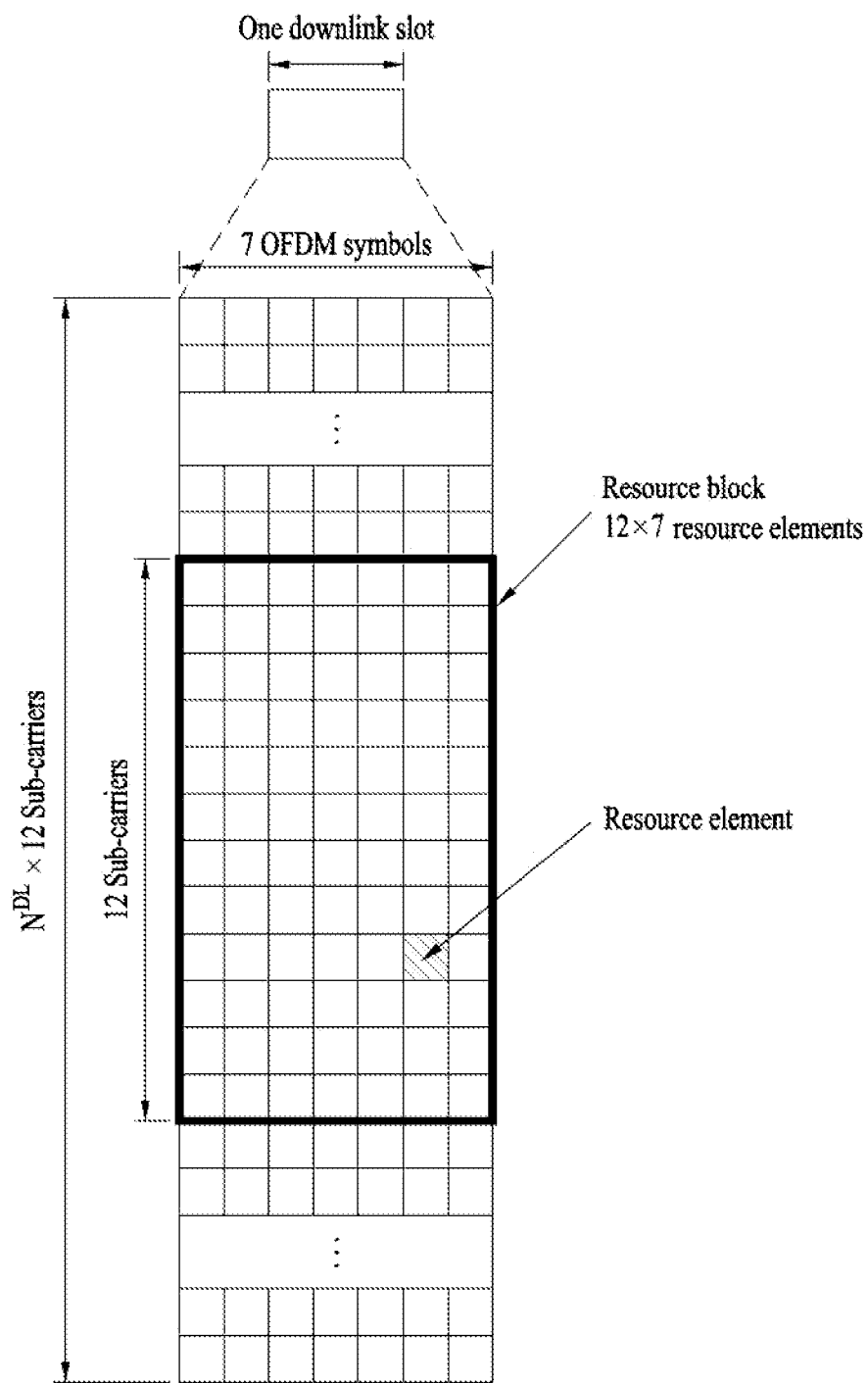
FIG. 2 illustrates a control plane and a user plane of a radio interface protocol architecture between a UE and an E-UTRAN based on a 3GPP radio access network standard.

FIG. 2 is a diagram illustrating an example of a resource grid in one downlink slot. OFDM symbols are configured by the normal CP. Referring to FIG. 2, the downlink slot includes a plurality of OFDM symbols in the time domain and includes a plurality of RBs in the frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, an RE a(k,l) is located at a kth subcarrier and an lth OFDM symbol. In case of a normal CP, one RB includes 12 7 REs (in case of an extended CP, one RB includes 12 6 REs). Since the spacing between subcarriers is 15 kHz, one RB is about 180 kHz in the frequency domain. NDL denotes the number of RBs included in the downlink slot. NDL is determined based on a downlink transmission bandwidth set through Node B scheduling.

Figure 3:
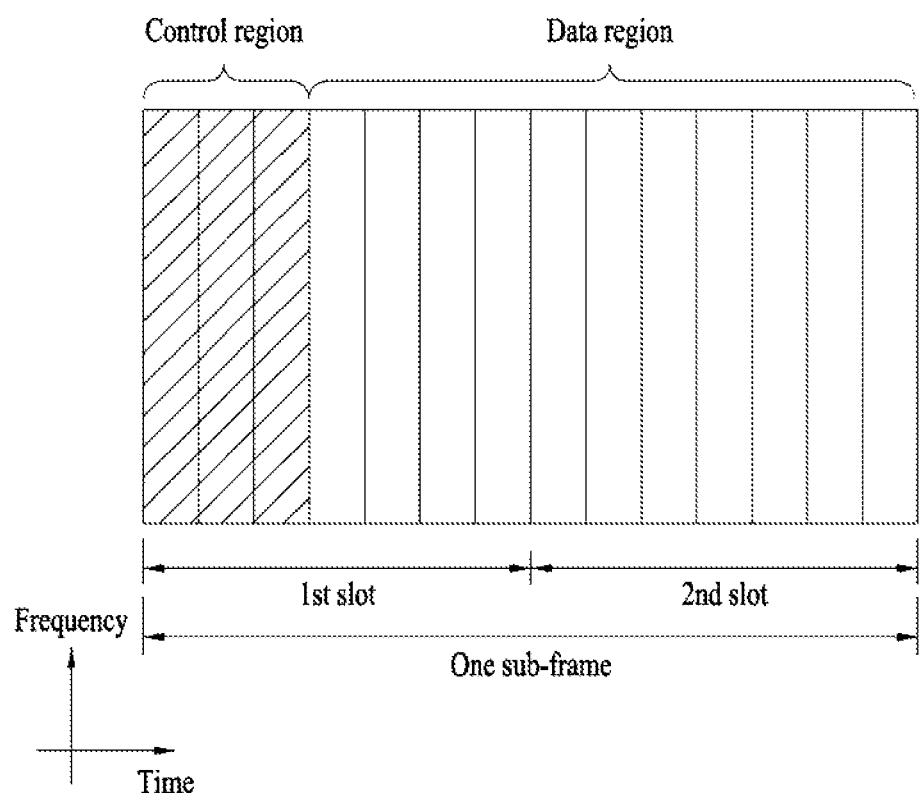
FIG. 3 illustrates physical channels used in a 3GPP system and a general signal transmission method using the same.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
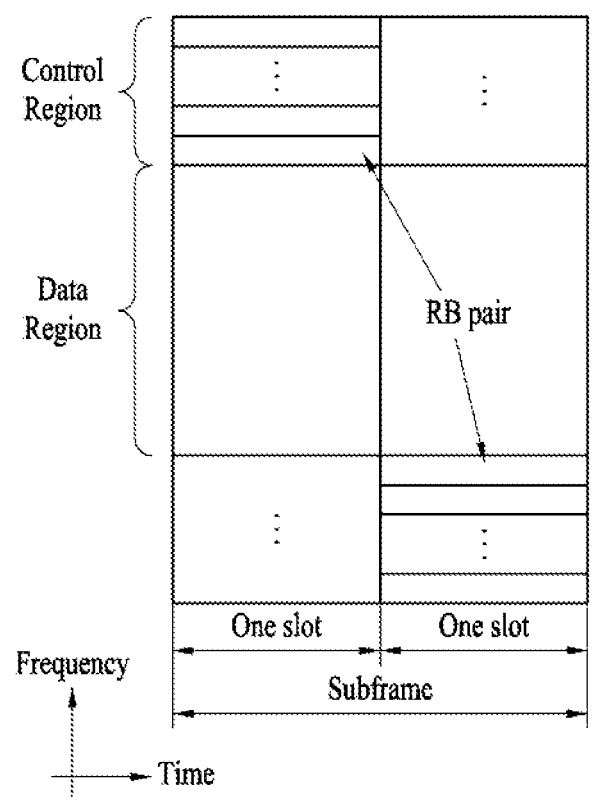
FIG. 4 illustrates the structure of a radio frame used in an LTE system.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \quad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN added to the NR Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
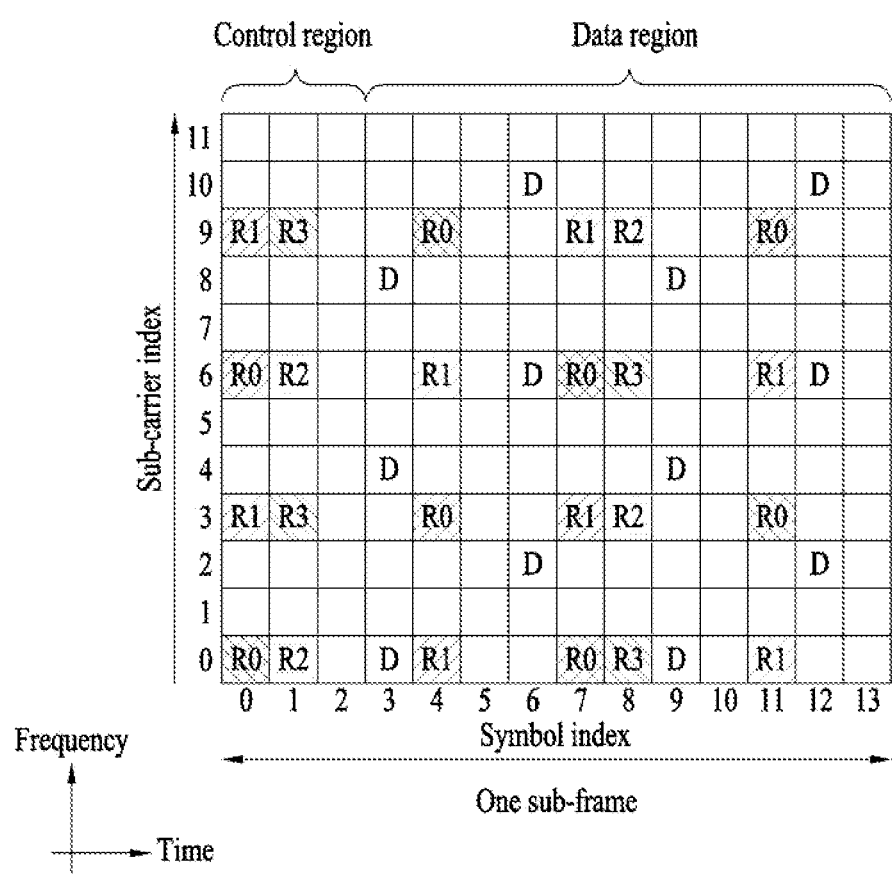
FIG. 6 illustrates the structure of an uplink subframe used in an LTE system.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
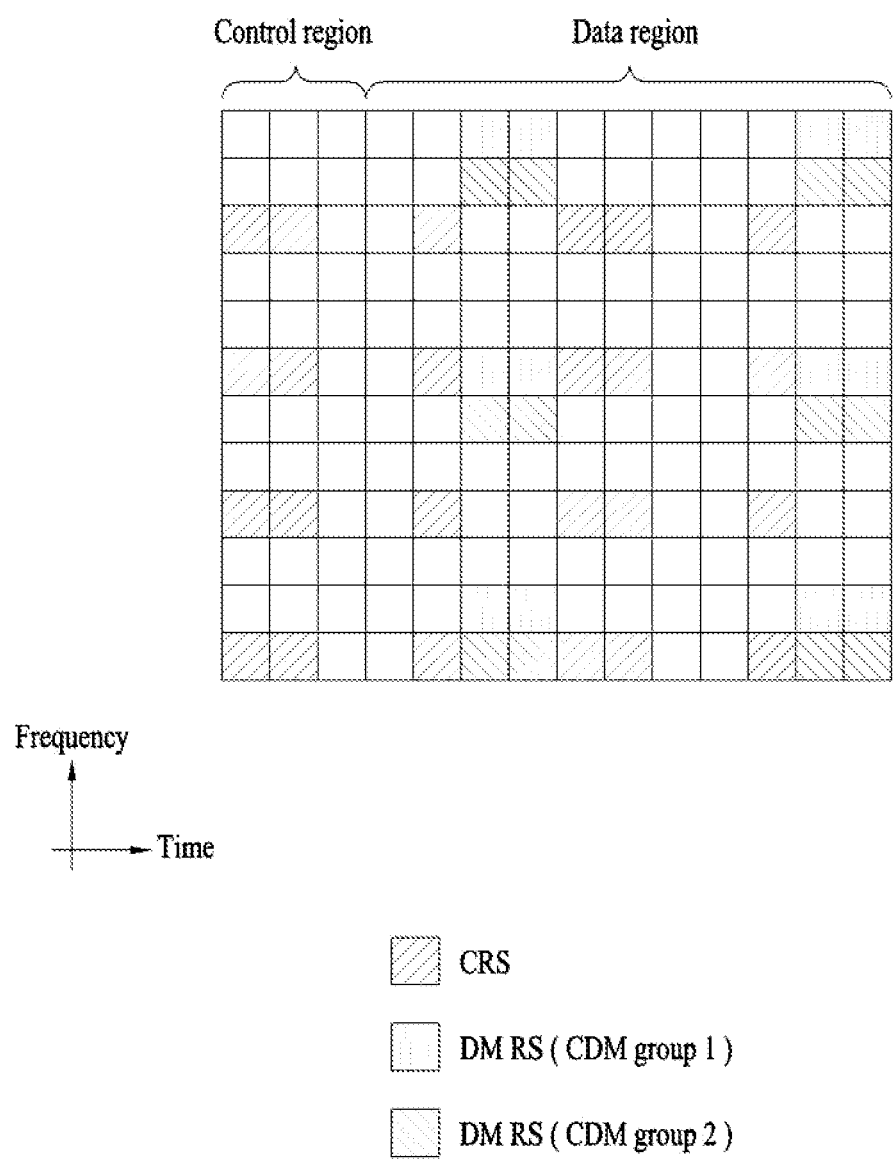
FIG. 7 illustrates the configuration of a general MIMO communication system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
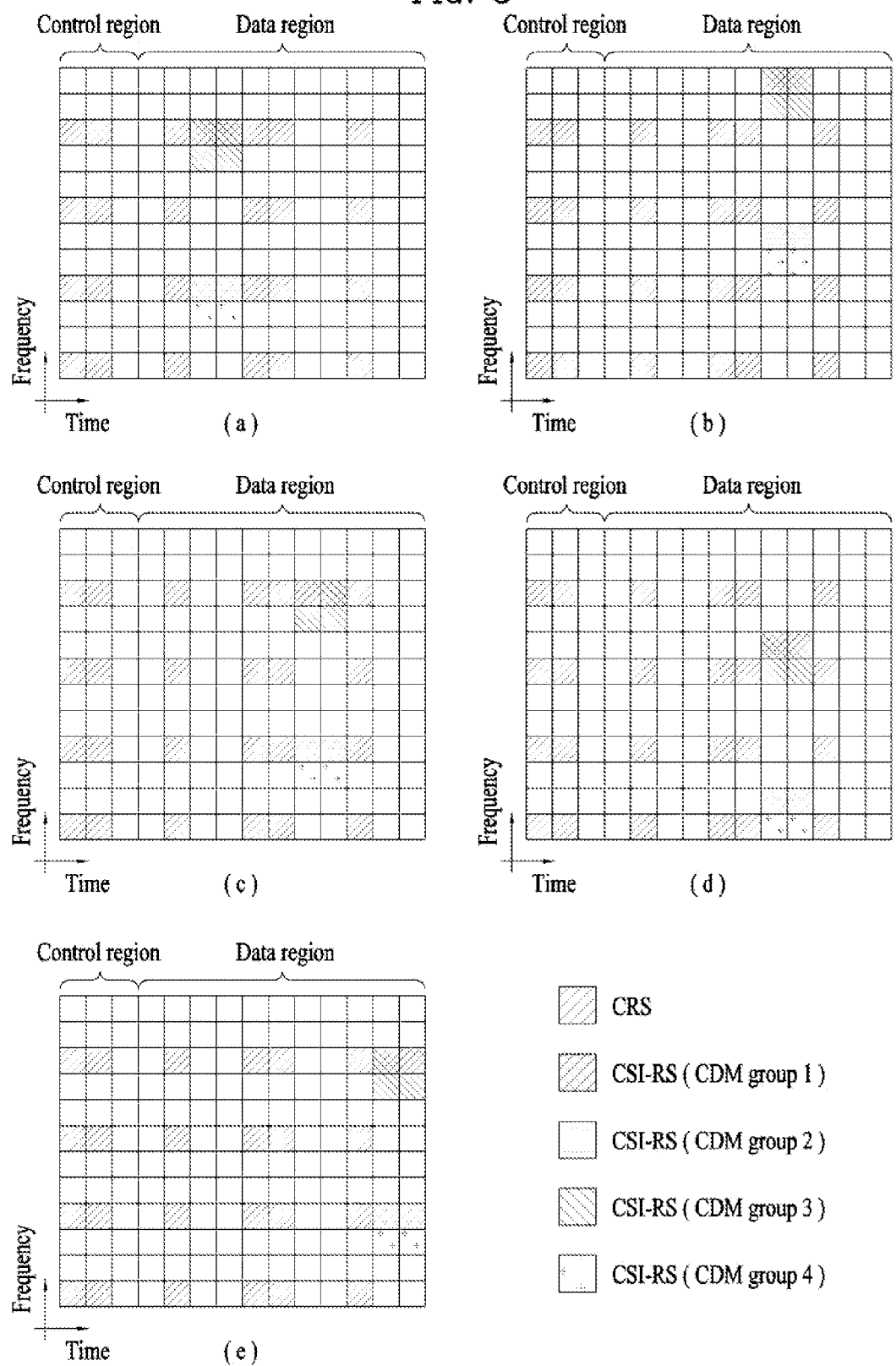

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

Figure 9:
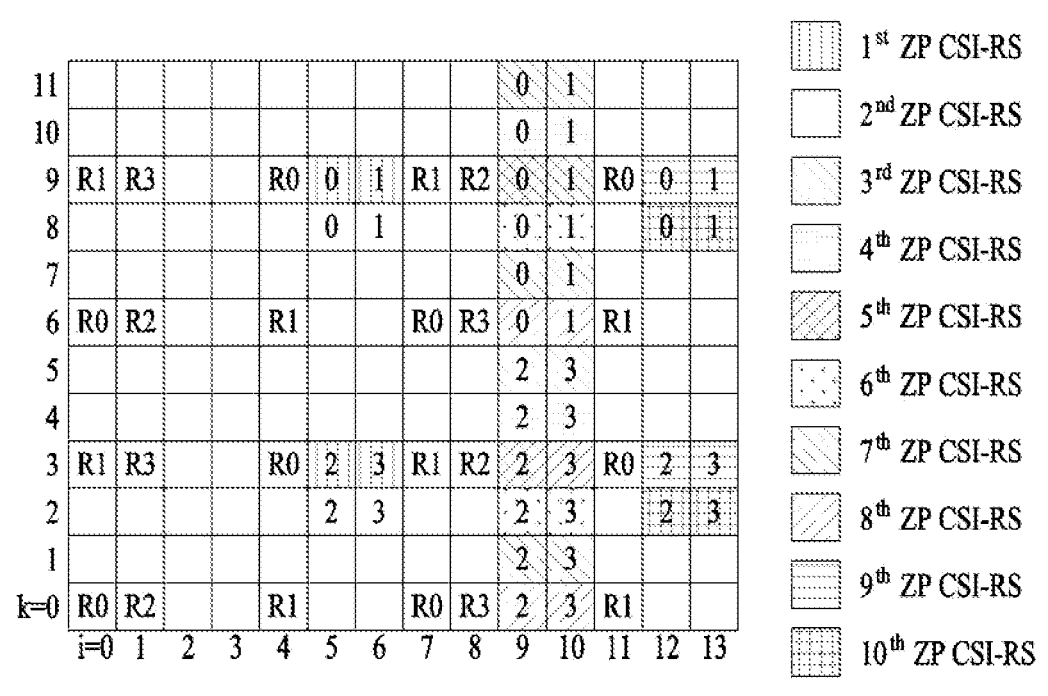

FIG. 9 is a diagram illustrating an exemplary Zero-Power (ZP) CSI-RS pattern defined in an LTE-A system. A ZP CSI-RS is largely used for two purposes. First, the ZP CSI-RS is used to improve CSI-RS performance. That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

FDR refers to transmission and reception technology in which an eNB and/or a UE support transmission without separately performing uplink/downlink duplexing in frequency/time, etc.

Figure 10:
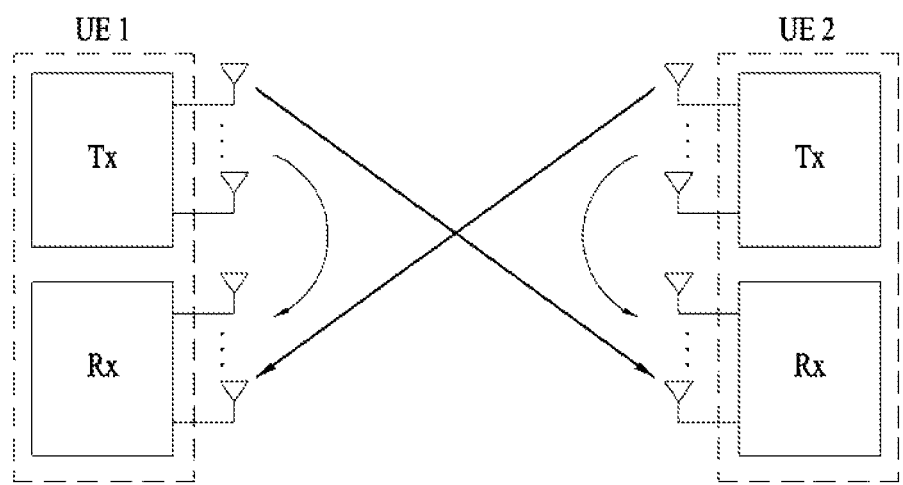
FIG. 10 illustrates an exemplary interference situation in an FDR scheme.

FIG. 10 is a diagram illustrating an exemplary interference situation in an FDR scheme.

Referring to FIG. 10, UE 1 and UE 2 perform communication on uplink/downlink using the same frequency/time resource. Accordingly, each UE may perform transmission and simultaneously receive a signal from another eNB or UE. That is, as illustrated in dotted lines of FIG. 10, a communication environment in which a transmission signal of a device is received by a reception module (or a receiver) of the device to directly cause self-interference is formed.

When a multi-cell deployment environment is considered in a system, new interference or increased interference, which is expected due to introduction of FDR, is summarized as follows.

(1) Self-interference (Intra-device self-interference)
(2) Multi-user interference (UE to UE inter-link interference)
(3) Inter-cell interference (BS to BS inter-link interference)

Self-interference indicates that a signal transmitted from a device directly causes interference with respect to a receiver of the device as illustrated in FIG. Generally, a self-interference signal is received with a higher power than a desired signal. Therefore, it is important to perfectly cancel self-interference through an interference cancellation operation.

Second, multi-user interference refers to interference occurring between UEs. For example, multi-user interference indicates that a signal transmitted by a UE is received by an adjacently located UE, thereby acting as interference. In a legacy communication system, since a half-duplex mode (e.g., FDD or TDD) in which uplink or downlink transmission is separately performed in frequency or time is implemented, interference does not occur between uplink and downlink. However, an FDR transmission environment in which uplink and downlink share the same frequency/time resource causes interference between an eNB that transmits data and adjacent UEs as illustrated in FIG. 10.

Lastly, inter-cell interference represents interference occurring between eNBs. For example, inter-cell interference indicates that a signal transmitted by one eNB in a heterogeneous eNB situation is received by a reception antenna of another eNB, thereby acting as interference. This interference represents the same communication situation as multi-user interference and occurs by sharing uplink and downlink resources between eNBs. That is, although FDR can increase frequency efficiency by sharing the same time/frequency resources in uplink and downlink, increased interference may restrict frequency efficiency improvement.

Among the above three types of interference, (1) self-interference should be solved first for FDR operation due to affect of interference occurring only in FDR. FIG. 10 shows exemplary FDR in a self-interference situation. In more detail, a signal transmitted by one UE is received by a reception antenna of the same UE, thereby acting as interference.

Such self-interference has unique characteristics as opposed to other interference.

First, a signal serving as interference may be regarded as a perfectly known signal.

Figure 11:
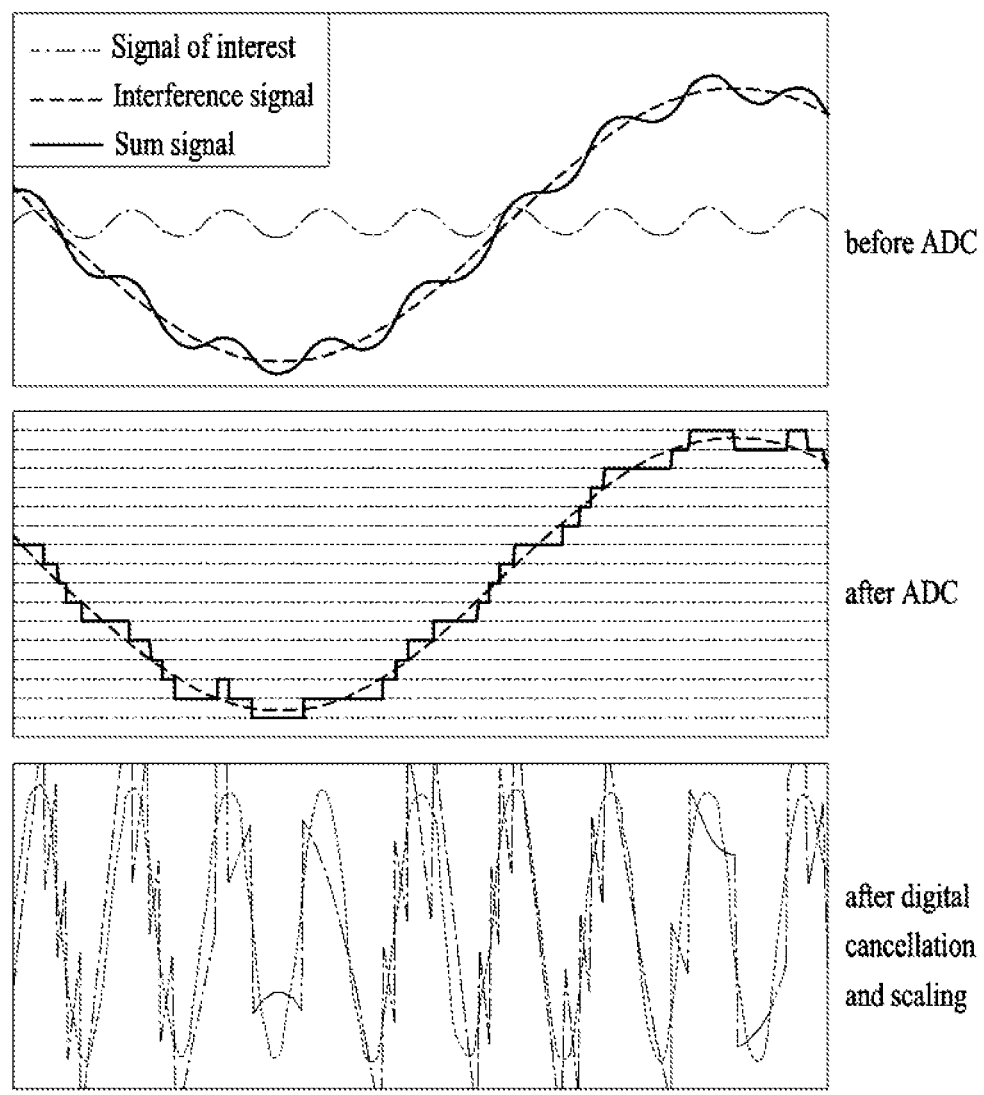
FIG. 11 illustrates exemplary interference signal cancellation when power of an interference signal is much higher than power of a desired signal

Second, power of a signal serving as interference is considerably higher than power of a desired signal. Accordingly, even if a signal serving as interference is perfectly known, a receiver cannot perfectly cancel interference. The receiver uses an Analog-to-Digital Converter (ADC) to convert a received signal into a digital signal. Generally, the ADC measures power of a received signal to adjust a power level of the received signal, quantizes the power-adjusted received signal, and converts the quantized signal into a digital signal. However, if an interference signal is received at a remarkably higher power relative to a desired signal, characteristics of the desired signal are covered by a quantization level during quantization and thus the received signal may not be restored. FIG. 11 is a diagram illustrating distortion of a desired signal even after cancellation of an interference signal during quantization is performed when power of the interference signal is much higher than power of the desired signal and FIG. 12 is a diagram illustrating restoration of a desired signal after an interference signal is cancelled when power of the interference signal is lower than power of the desired signal.

Figure 12:
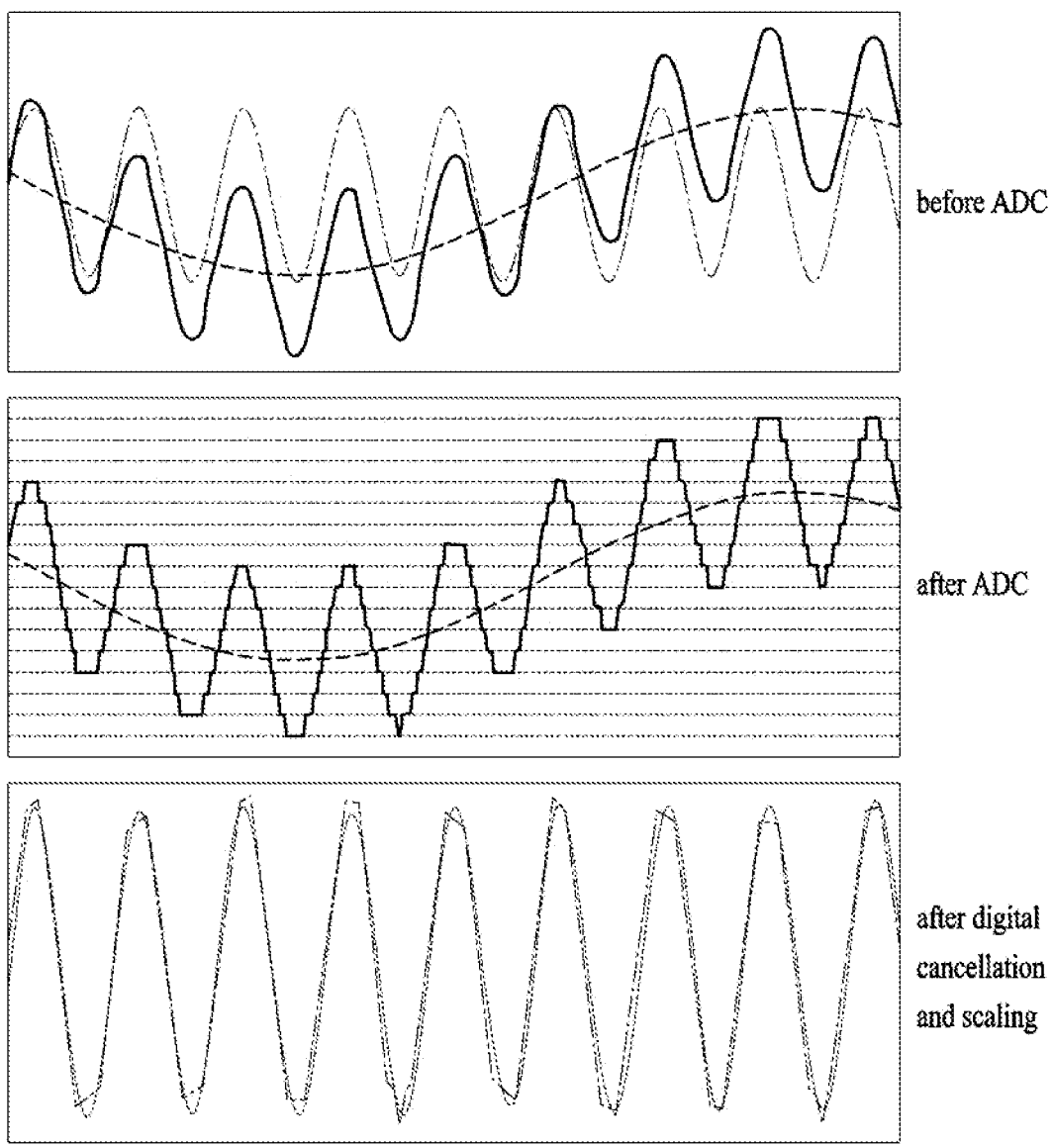
FIG. 12 illustrates an example of the case in which power of an interference signal is lower than power of a desired signal.

As can be seen from FIGS. 11 and 12, when self-interference is properly cancelled, the desired signal may be well received FDR and RS In a wireless communication system, size and phase of a symbol are distorted due to multi-path attenuation and, to compensate for the distorted size and phase through estimation, a channel estimation scheme using an RS is mainly used.

According to the present invention, an RS configuration method capable of improving channel estimation performance of an eNB or a UE in which self-interference occurs may be provided. An RS of the channel estimation method according to the present invention is applicable to both an eNB and a UE that use FDR and is applicable to communication between UEs as well as communication between the eNB and the UE.

In general, since a communication system such as an LTE system differs in an uplink frequency and a downlink frequency, locations of uplink and downlink RSs are independent. However, in a system supporting FDR, since a downlink signal of the eNB is received through uplink or an uplink signal of the UE is received through downlink, an effect of equalizing downlink and uplink frequencies appears in the eNB and the UE.

Although the channel estimation method according to the present invention is allocable to both the eNB and the UE, a system in which the eNB transmits a signal to the UE will be described first for convenience of description.

First Embodiment

The first embodiment according to the present invention relates to an RS configuration method for channel estimation in a system in which an eNB transmits a signal to a UE. Specifically, the first embodiment of the present invention relates to a puncturing RS arrangement method capable of improving channel estimation performance of an eNB in which self-interference occurs in an FDR system.

In this case, since the eNB has the purpose of cancelling a downlink signal thereof received through uplink, the eNB configures RSs to receive only one signal for channel estimation among a downlink signal and an uplink signal.

The eNB informs each UE through downlink of puncturing RS locations and a puncturing period. Next, the eNB uses a puncturing scheme in which the eNB uses downlink REs corresponding to resource locations of puncturing RSs during resource allocation and does not use corresponding uplink REs. That is, when the eNB transmits a signal to the UE, the eNB transmits puncturing RSs on a configured resource of downlink so that the UE does not use REs corresponding to the puncturing RSs on UL.

Figure 13:
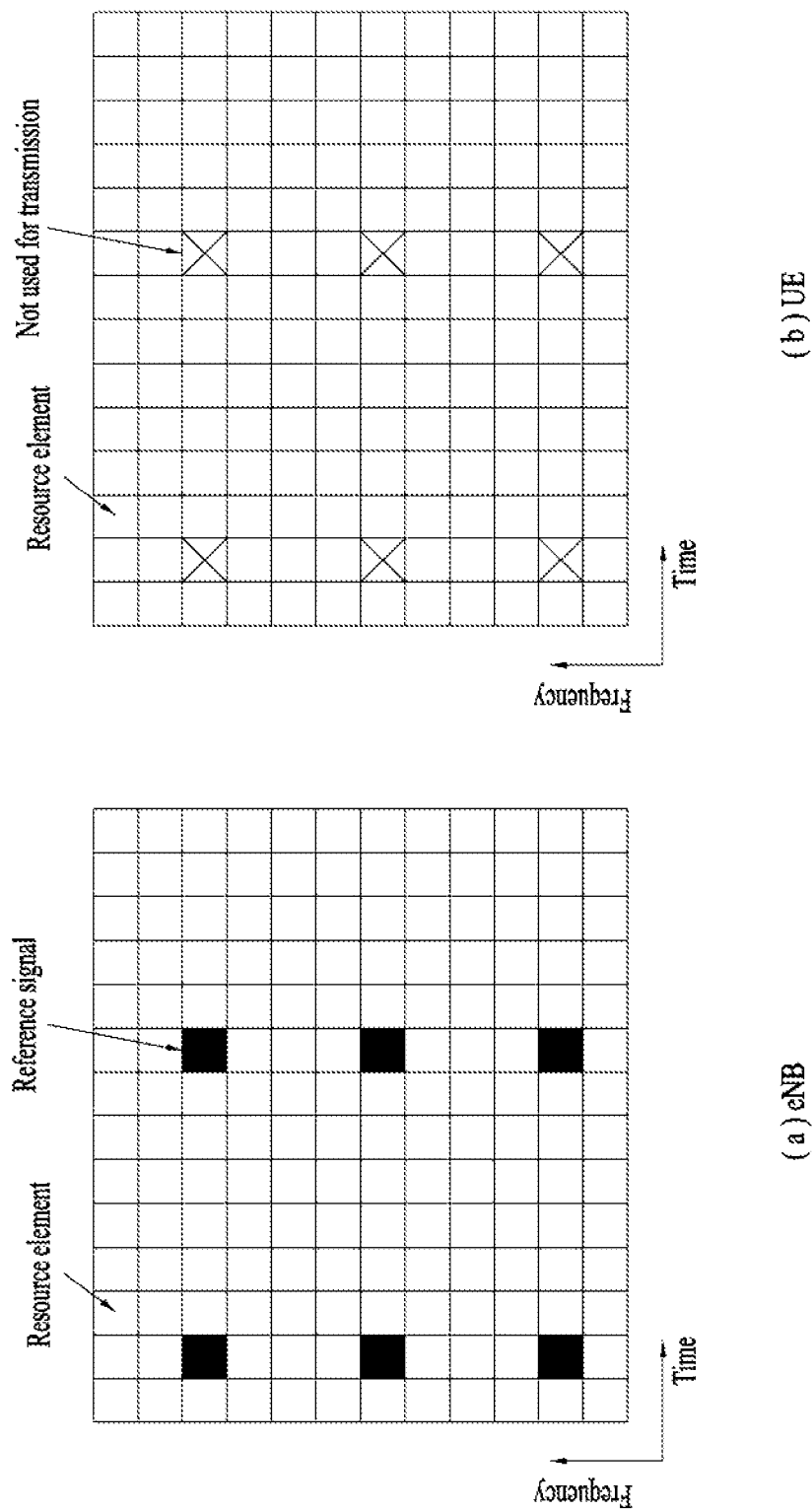
FIG. 13 illustrates exemplary resource allocation of a puncturing RS configuration method in communication between an eNB and a UE.

FIG. 13 illustrates exemplary resource allocation of a puncturing RS configuration method in communication between an eNB and a UE.

In the puncturing RS configuration method according to the present invention, information about resource locations of puncturing RSs is shared, the puncturing RS configuration method may be used for communication between one eNB and multiple UEs as well as communication between one eNB and one UE.

Furthermore, density and locations of puncturing RSs for resource arrangement may be preset to multiple modes using system parameters and the eNB and the UE may share the modes. The eNB may transmit mode selection information over a downlink control channel so as to select a mode.

Figure 14:
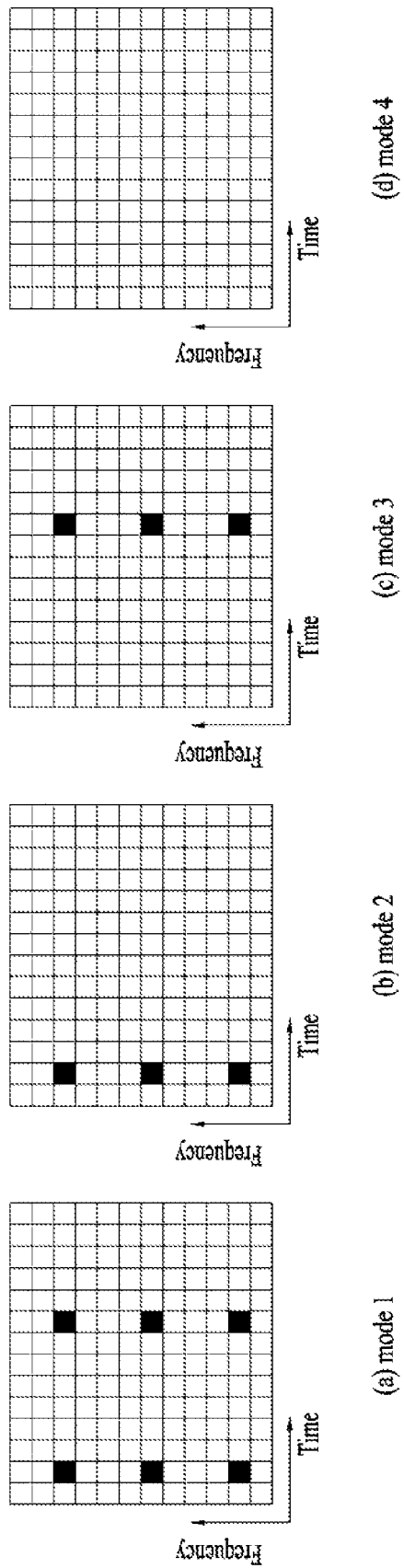
FIG. 14 illustrates an exemplary puncturing RS mode according to an embodiment of the present invention.

FIG. 14 illustrates an exemplary puncturing RS mode according to an embodiment of the present invention. Referring to FIG. 14, in mode 1, RSs are transmitted on all resources allocated as puncturing RSs. In mode 2, puncturing RSs are transmitted on some of the resources allocated as the puncturing RSs. In mode 3, puncturing RSs are transmitted on the other resources except for the resources used in mode 2 among the resources allocated as the puncturing RSs. In mode 4, no RSs are transmitted on all of the resources allocated as the puncturing RS. In this case, mode 1 and mode 4 may be used as a pair and mode 2 and mode 3 may be used as a pair.

Mode information about puncturing RSs may be transmitted using one of the following methods.

First, the mode information may be transmitted using a dynamic indication method.

In an environment in which a channel is frequently changed or in order to improve channel estimation performance, channel estimation should be frequently performed. To select a puncturing RS mode in each Transmit Time Interval (TTI), the mode information may be transmitted over a control channel transmitted in each TTI. In 3GPP LTE for example, the mode information may be transmitted over a PDCCH or an EPDCCH and a bit for the control channel may be allocated to a DCI format. For example, the mode information may be transmitted in every TTI.

Next, the mode information may be transmitted using a semi-static indication method.

Since a channel for a self-interference signal indicates a channel between transmission and reception antennas of a device, a channel environment may be regarded as being nearly static. Generally, a method of using a complicated estimation algorithm or increasing RSs is mainly used to improve channel estimation performance. However, since data corresponding to increase of the RSs cannot be transmitted, overhead caused by the RSs increases. RS overhead is determined according to density and a transmission period. For example, if RSs are transmitted according to mode 2 after RSs are transmitted according to mode 1, overhead is halved. As another example, if RSs are transmitted in every two TTIs (2-TTI) after RSs are transmitted in every TTI, overhead is halved If a channel is not frequently changed, channel estimation performance may be adjusted to be almost the same even though RS overhead is reduced. That is, since there is a tradeoff between channel estimation performance and RS overhead, RS overhead may be adjusted according to a static degree of a channel environment.

Therefore, in a semi-static environment, overhead can be reduced in consideration of reduction of channel estimation performance as compared with a dynamic environment. For example, density of RSs may be reduced in every TTI during a predetermined number or more of TTIs (or a TTI group). Change from mode 1 to mode 2 or mode 3 of FIG. 14 corresponds to such an example. Alternatively, no RSs may be transmitted during a predetermined number or more of TTIs (or a TTI group). For example, change from mode 1 to mode 4 corresponds to such an example. A mode of puncturing RSs and size of a TTI group may be transmitted over a control channel transmitted in each TTI. In 3GPP LTE for example, mode information may be transmitted over a PDCCH or an EPDCCH and a bit for the control channel may be allocated to a DCI format.

In addition, the mode information may be transmitted using a static indication method.

If a channel environment is more static than a semi-static environment, a dense RS mode (e.g., mode 1 of FIG. 14) may be used only during a periodic TTI and a mode having density of '0' (e.g., mode 4 of FIG. 14) may be used during the other TTIs. To this end, the mode information about puncturing RSs using system parameters may be transmitted.

In addition, a semi-static and overhead decrease method may be used.

When a puncturing scheme is used, UEs cannot transmit data to corresponding REs, thereby increasing UE overhead. Since there is a high probability that power of a self-interference of an eNB is high and a channel is static, the eNB may effectively cancel self-interference using channel estimation. If a downlink puncturing RS and another signal (a data signal of a UE) are received in an overlapped form, a receiver of the eNB recognizes most of the received signals nearly as the downlink puncturing RS due to a difference in power of the signals. Therefore, since the downlink puncturing RS can be eliminated from the overlapping signals, another received signal can be separated. According to this method, since another uplink signal of the UE overlaps the downlink puncturing RS in the receiver of the eNB, channel estimation performance is reduced and an error of data of a corresponding part of the UE may increase. However, UEs may transmit data on resource locations of puncturing RSs so as not to overlap, thereby reducing UE overhead.

In the semi-static and overhead decrease method, information may be transmitted in a similar way to the dynamic indication method. RE locations that the UE is to additionally use may be differently defined for each UE by transmitting a mode for additional RE locations through UE-specific signaling. In this case, RE locations to be additionally used by the UE should not be overlapped between UEs in a cell.

Figure 15:
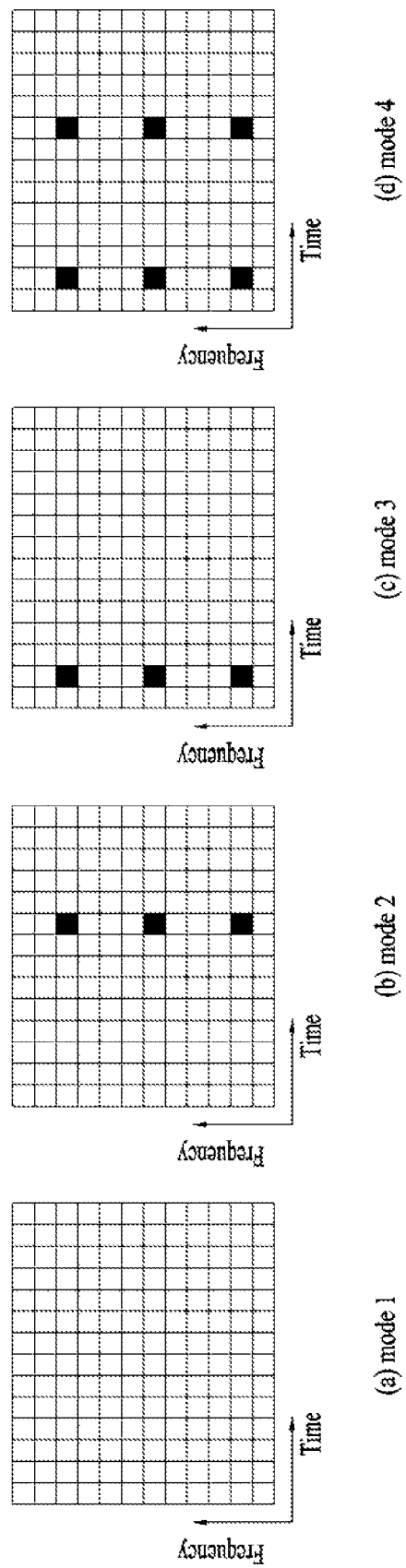
FIG. 15 illustrates an exemplary additional RE mode for a semi-static and overhead decrease method.

FIG. 15 illustrates an exemplary additional RE mode for a semi-static and overhead decrease method.

Referring to FIG. 15, in additional RE mode 1, no resources to be additionally used by the UE are transmitted to all resources allocated as puncturing RSs. In additional RE mode 2, the resources to be additionally used by the UE are allocated to some of the resources allocated as the puncturing RSs. In additional RE mode 3, the resources to be additionally used by the UE are allocated to the other resources except for the resources allocated in mode 2 among the resources allocated as the puncturing RSs. In additional RE mode 4, the resources to be additionally used by the UE are allocated to all of the resources allocated as the puncturing RSs.

Figure 16:
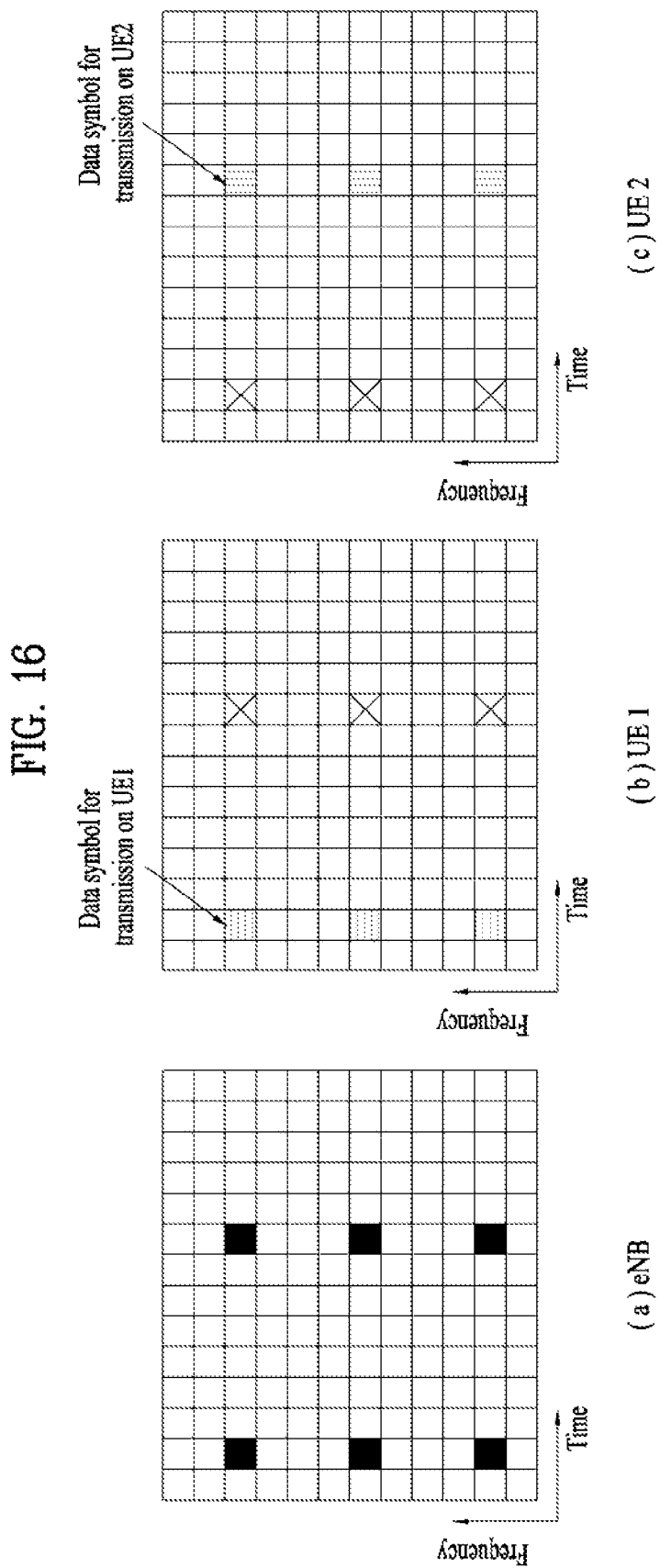
FIG. 16 illustrates exemplary resource allocation to an eNB and UEs.
Figure 17:
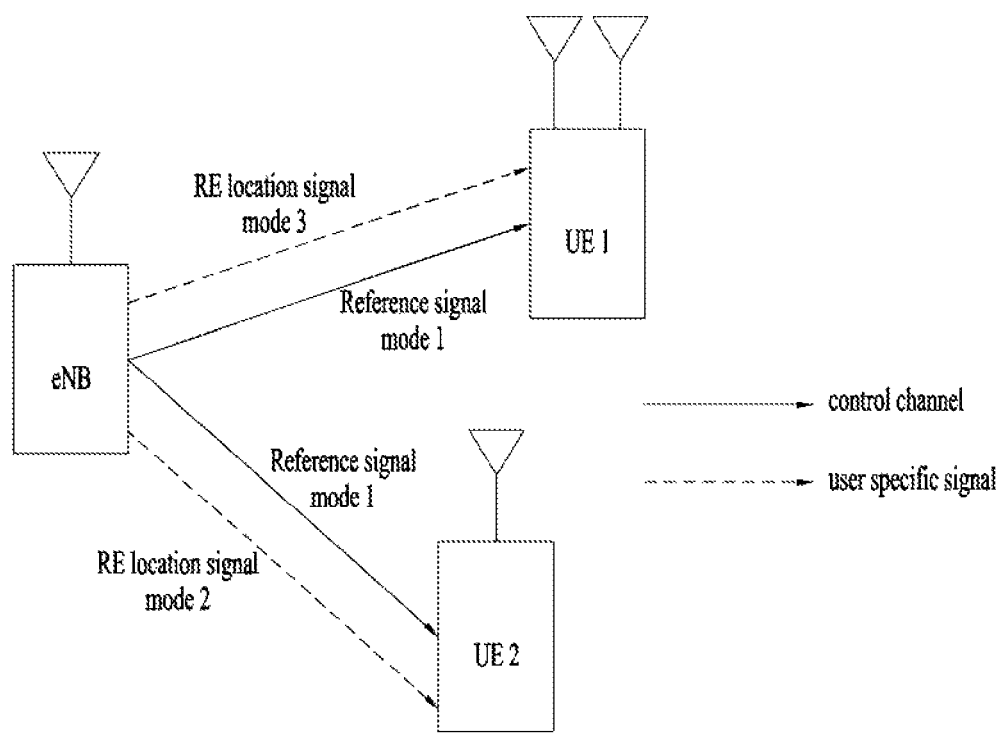
FIG. 17 illustrates an exemplary RS mode and additional RE mode transmission method for FIG. 16.

FIG. 16 illustrates exemplary resource allocation to an eNB and UEs. FIG. 17 illustrates an exemplary RS mode and additional RE mode transmission method for FIG. 16. In embodiments of FIGS. 16 and 17, an eNB transmits RS mode 1 over a control channel and transmits additional RE signal mode 3 to UE 1 and additional RE signal mode 2 to UE 2 through UE-specific signaling.

Second Embodiment

The second embodiment of the present invention relates to an RS configuration method for improving channel estimation performance when a UE supporting FDR transmits a signal to an eNB.

In an LTE system for example, since the eNB manages resource allocation, the eNB may transmit mode information about puncturing RSs over a downlink control channel. That is, the eNB may transmit a puncturing RS mode to be used by the UE using FDR and an RS mode to be used by the other UEs.

The eNB informs each UE of locations and a period of puncturing RSs through downlink and does not use downlink REs corresponding to the locations of the puncturing RSs during resource allocation. In a puncturing scheme, the UE using FDR uses uplink REs and UEs except for the UE using FDR do not use the uplink REs. That is, only the UE using FDR uses the corresponding REs.

A puncturing RS mode may be configured as in the first embodiment for signal transmission from the eNB to the UE. However, since the eNB manages resource allocation of the UE and, in actuality, the UE uses FDR, an RS transmission scheme suitable for this situation is needed.

The eNB may transmit mode information about puncturing RSs to all UEs over a downlink control channel. Thereafter, the eNB additionally transmits a puncturing RS mode to the UE using FDR through UE-specific signaling so that the UE may arrange RSs. Since the eNB is aware of the puncturing RS mode thereof, transmission of the puncturing RS mode is not needed.

Figure 18:
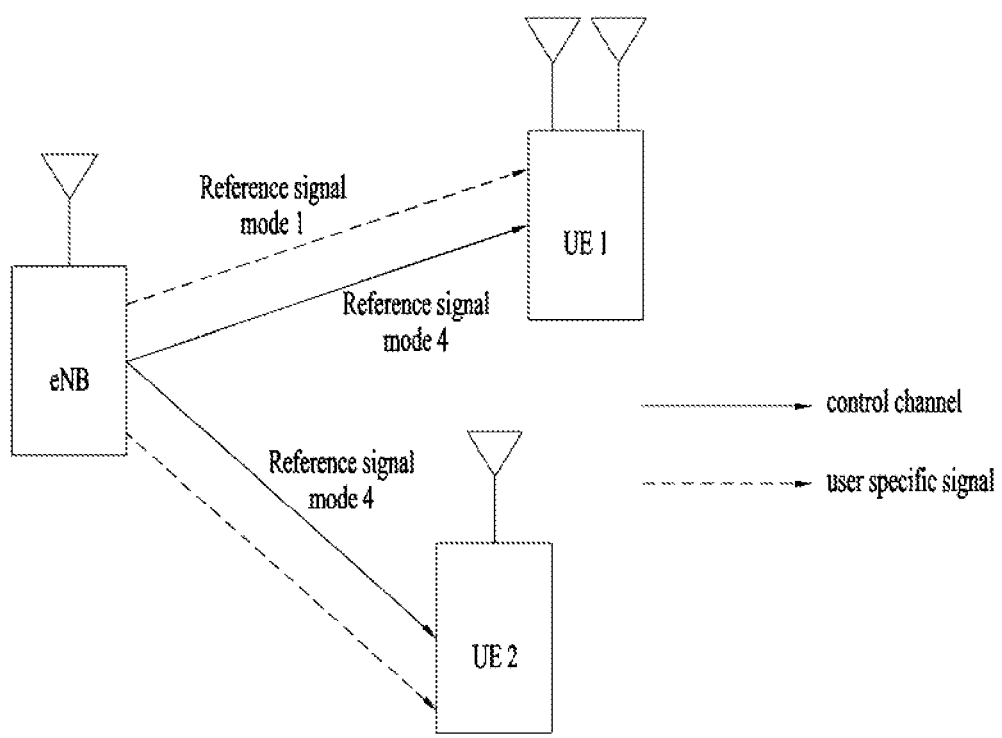
FIG. 18 illustrates exemplary transmission of RS mode information by an eNB through a control channel and UE-specific signaling when UE 1 uses FDR.
Figure 19:
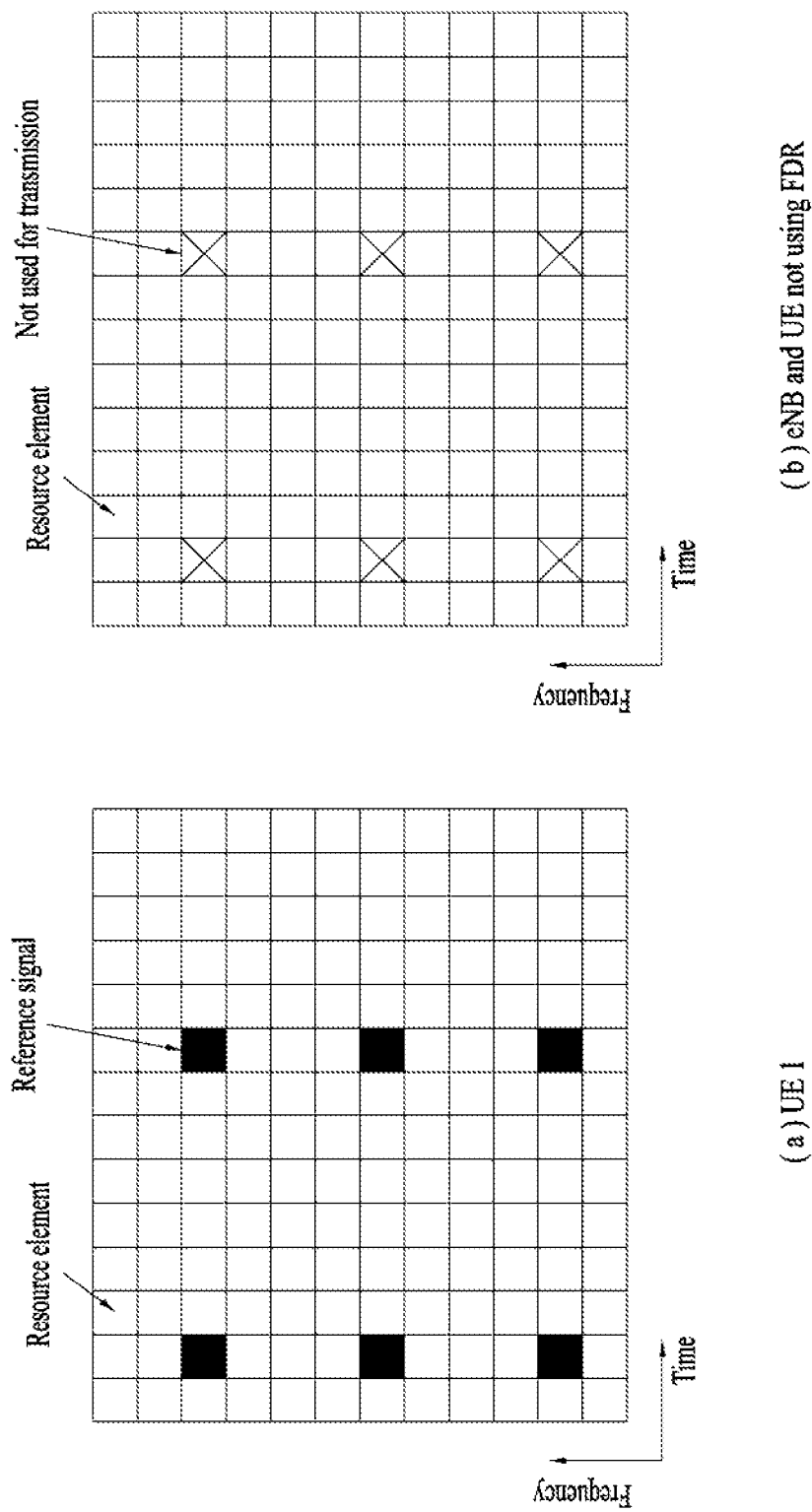
FIG. 19 illustrates an embodiment of resource allocation for RS transmission only in UE 1 supporting FDR in FIG. 18.

FIG. 18 illustrates exemplary transmission of RS mode information by an eNB through a control channel and UE-specific signaling when UE 1 uses FDR. In this case, the eNB transmits RS mode 4 through a downlink control channel and transmits RS mode 1 to UE 1 through UE-specific signaling. FIG. 19 illustrates an embodiment of resource allocation for RS transmission only in UE 1 supporting FDR in FIG. 18.

Figure 20:
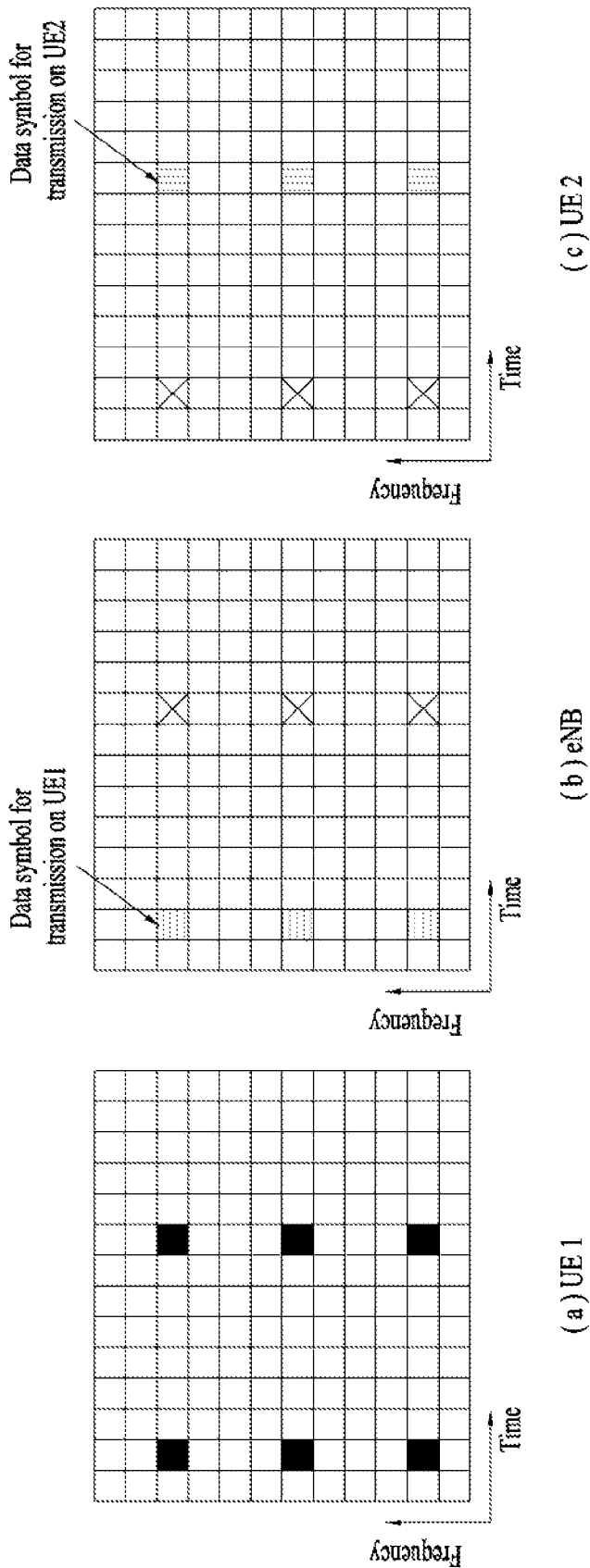
FIG. 20 illustrates exemplary resource allocation for puncturing RSs and data transmission when UE 1 uses FDR.
Figure 21:
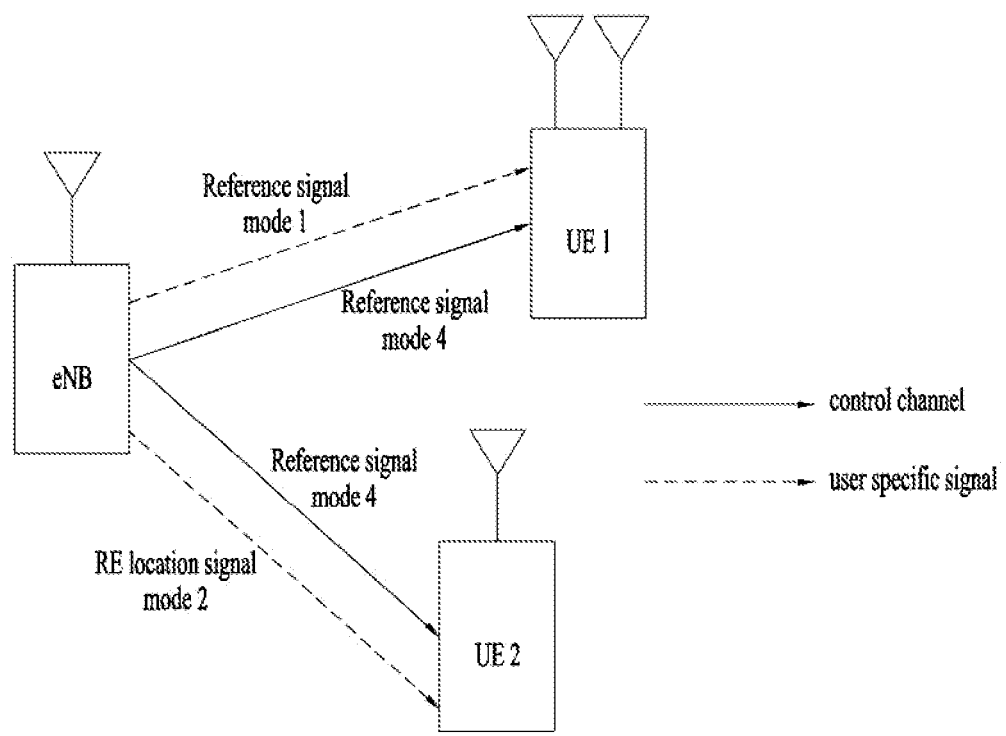
FIG. 21 illustrates exemplary RS mode and additional RE mode information transmission for FIG. 20.

To apply the semi-static and overhead decrease method defined in the first embodiment for signal transmission from the eNB to the UE to the second embodiment for signal transmission from the UE to eNB, an additional RE mode may be differently defined with respect to each UE through UE-specific signaling. FIG. 20 illustrates exemplary resource allocation for puncturing RSs and data transmission when UE 1 uses FDR. Referring to FIG. 20, UE 1 is configured as puncturing RS mode 1 of FIG. 14. The eNB is configured as additional RE mode 3 of FIG. 15. UE 2 is configured as additional RE mode 2 of FIG. 15. FIG. 21 illustrates exemplary RS mode and additional RE mode information transmission for FIG. 20.

Third Embodiment

The third embodiment of the present invention relates to FDR communication between an eNB and a UE. Specifically, the third embodiment relates to a puncturing RS arrangement method capable of improving channel estimation performance of an eNB and a UE in which self-interference occurs.

Since channel estimation of uplink and downlink is needed, RSs are configured such that REs used by the eNB and the UE do not overlap. That is, RSs are configured on non-overlapping REs between the eNB and the UE in the same TTI or RSs having non-zero density in another TTI when RS density in one TTI among multiple TTIs is zero are configured.

Figure 22:
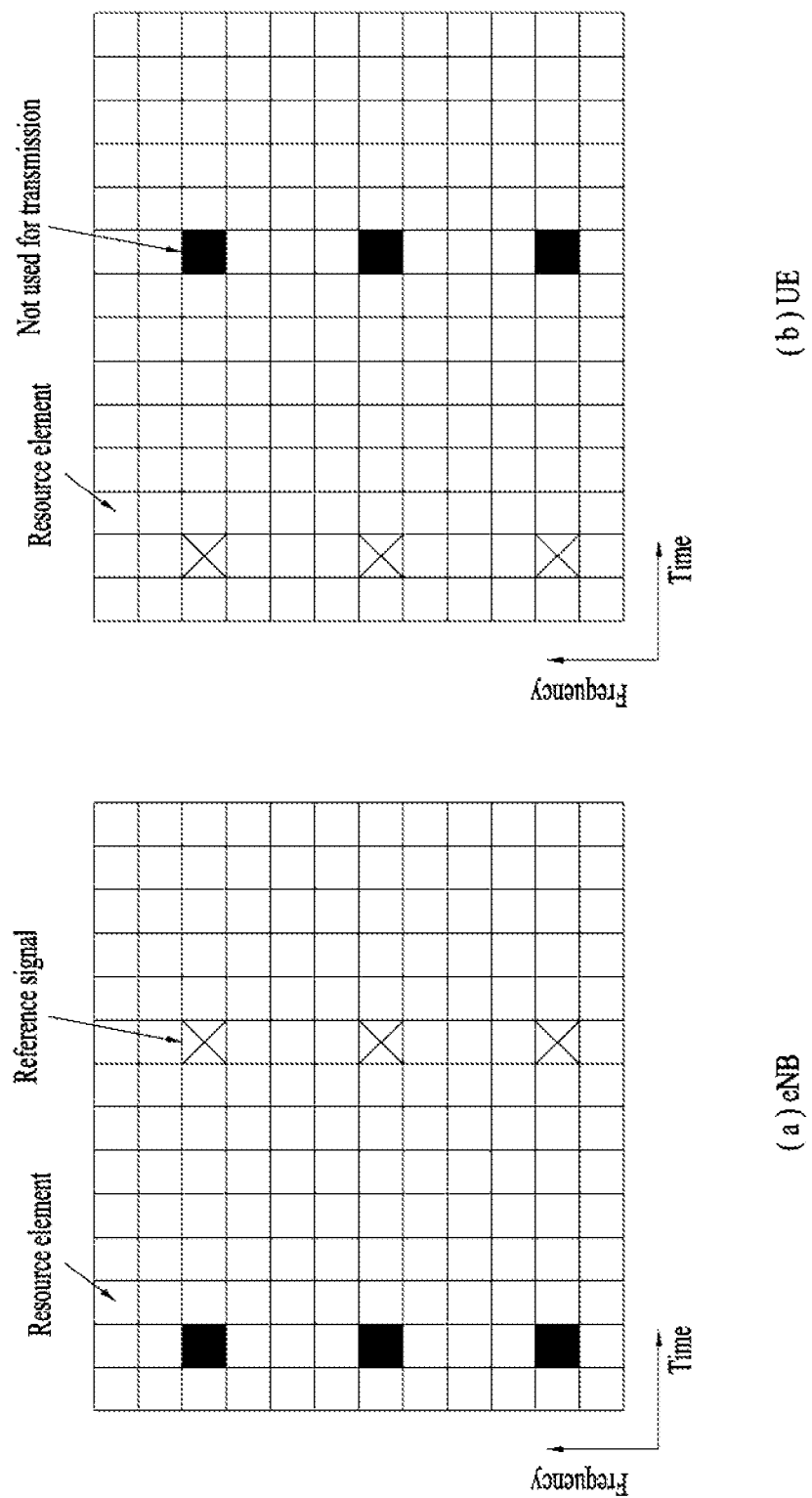
FIG. 22 illustrates exemplary RS configuration of an eNB and a UE on non-overlapping REs in the same TTI

In an LTE system for example, since the eNB manages resource allocation, the eNB may transmit a puncturing RS mode over a downlink control channel. FIG. 22 illustrates exemplary RS configuration of an eNB and a UE on non-overlapping REs in the same TTI. Referring to FIG. 22, the eNB is configured as puncturing RS mode 2 of FIG. 14 and the UE is configured as puncturing RS mode 3 of FIG. 14.

Figure 23:
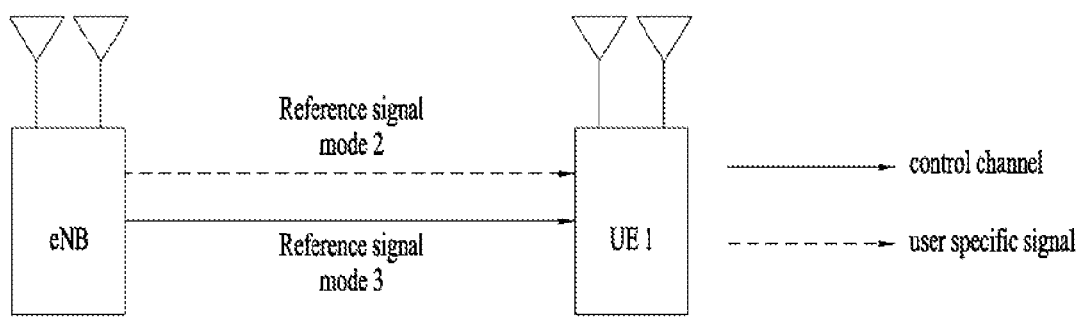
FIG. 23 illustrates exemplary RS mode and additional RE mode information transmission for FIG. 22.

In addition, the eNB is configured as additional RE mode 2 of FIG. 15 and the UE is configured as additional RE mode 3 of FIG. 15. FIG. 23 illustrates exemplary RS mode and additional RE mode information transmission for FIG. 22.

Figure 24:
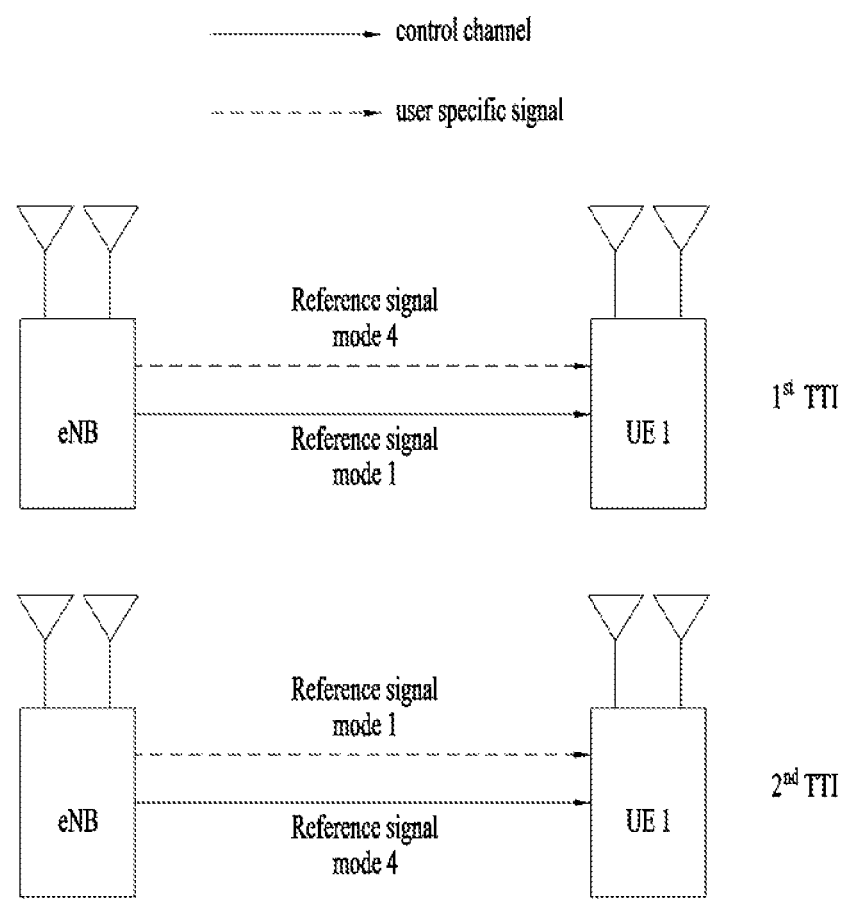
FIG. 24 illustrates an embodiment of RS transmission in which, when RS density in one of two TTIs is 0, RS density in the other TTI is not 0.

FIG. 24 illustrates an embodiment of RS transmission in which, when RS density in one of two TTIs is 0, RS density in the other TTI is not 0. Referring to FIG. 24, in the first TTI, the eNB transmits RS mode 1 through a control channel and transmits RS mode 4 through UE-specific signaling. In the second TTI, the eNB transmits RS mode 4 to UE and transmits RS mode 1 through UE-specific signaling.

To apply the semi-static and overhead decrease method described in the first embodiment to the third embodiment, an additional RE mode may be differently defined with respect to each UE through UE-specific signaling and a detailed method is the same as the method described in the second embodiment. In this case, since uplink and downlink channel estimation is needed, the eNB and the UE configure RSs on non-overlapping REs.

Meanwhile, since uplink and downlink channel estimation is needed when an eNB and multiple UEs use FDR, RSs are configured such that the RSs are transmitted on non-overlapping REs between the eNB and the multiple UEs. In this method, an RS resource mode is configured in the same manner of selecting non-overlapping REs in the third embodiment. Since the eNB manages resource allocation even in communication between UEs, the method for communication between the eNB and multiple UEs is applied.

Figure 25:
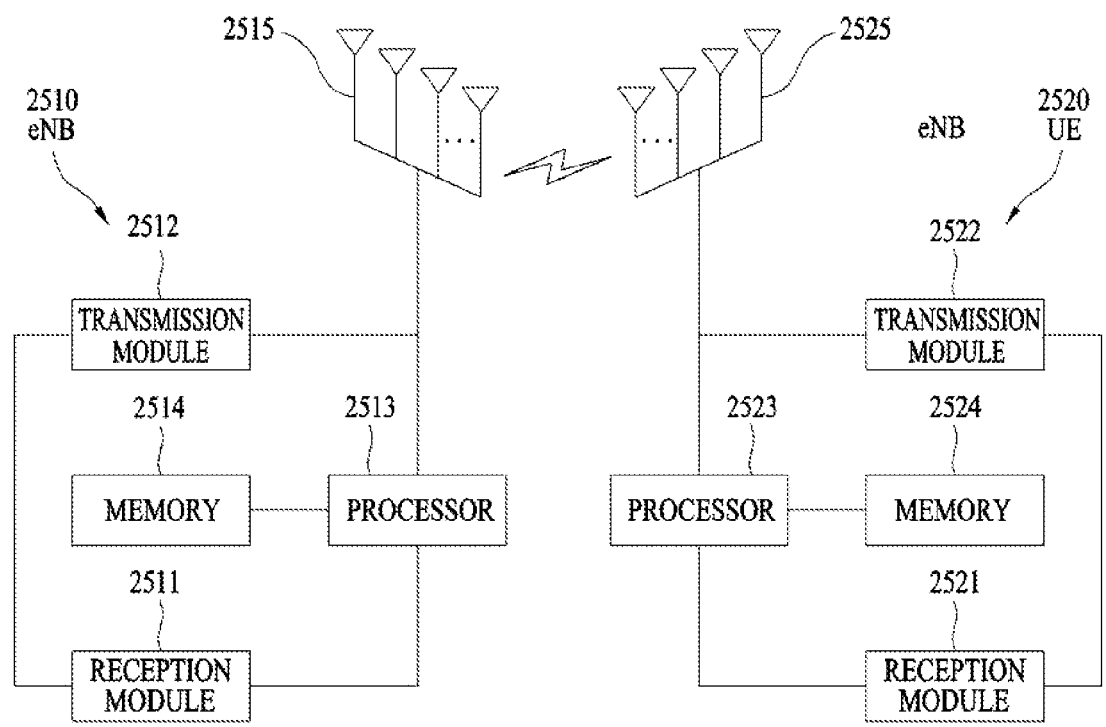
FIG. 25 illustrates an eNB and a UE that are applicable to an embodiment of the present invention.

FIG. 25 illustrates an eNB and a UE that are applicable to an embodiment of the present invention.

When a relay is included in a wireless communication system, communication in a backhaul link is performed between an eNB and the relay and communication in an access link is performed between the relay and a UE. Therefore, the eNB or the UE shown in the drawings may be replaced with the relay according to circumstance.

Referring to FIG. 25, a wireless communication system includes an eNB 2510 and a UE 2520. The eNB 2510 includes a processor 2513, a memory 2514, and Radio Frequency (RF) units 2511 and 2512. The processor 2513 may be configured to implement the procedures and/or methods proposed in the present invention. The memory 2514 is connected to the processor 1513 and stores a variety of information related to the operation of the processor 2513. The RF units 2511 and 2512 are connected to the processor 2513 and transmits and/or receives an RF signal. The UE 2520 includes a processor 2523, a memory 2524, and RF units 2521 and 2522. The processor 2523 may be configured to implement the procedures and/or methods proposed in the present invention. The memory 2524 is connected to the processor 2523 and stores a variety of information related to the operation of the processor 2523. The RF units 2521 and 2522 are connected to the processor 2523 and transmit and/or receive an RF signal. The eNB 2510 and/or the UE 2520 may include a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Those skilled in the art will appreciate that claims that are not explicitly cited in each other in the appended claims may be presented in combination as an embodiment of the present invention or included as a new claim by subsequent amendment after the application is filed. In this document, a specific operation described as being performed by the eNB may be performed by an upper node of the eNB in some cases. That is, in a network consisting of a plurality of network nodes including the eNB, it is apparent that various operations performed for communication with the UE may be performed by the eNB or network nodes other than the eNB. The term eNB may be replaced with fixed station, Node B, eNodeB (eNB), access point, and the like.

The above-described embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, the method according to the embodiments of the present invention may be implemented in the form of a module, a procedure, a function, etc. Software code may be stored in a memory unit and executed by a processor.

The memory unit is located at the interior or exterior of the processor and may transmit and receive data to and from the processor via various known means.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended, and all changes coming within the meaning and equivalency range of the appended claims are to be embraced therein. Claims that are not explicitly cited in the appended claims may be presented in combination as an exemplary embodiment of the present invention or included as a new claim by subsequent amendment after the application is filed.

INDUSTRIAL APPLICABILITY

The present invention is applicable to wireless communication devices such as a UE, a relay, and an eNB.

What is claimed is:

1. A method for receiving a signal from a Base Station (BS) by a User Equipment (UE) in a wireless access system supporting Full Duplex Radio (FDR) transmission, the method comprising:

receiving, from the BS, reference signal mode information indicating resource elements on which a reference signal is transmitted among available reference signal resource elements allocated to transmit the reference signal;

receiving additional resource mode information indicating additional data resource elements for transmitting data among the resource elements indicated by the reference signal mode information; and receiving the reference signal through the resource elements indicated by the reference signal mode information within a subframe and simultaneously transmitting the data through resource elements excluding the resource elements indicated by the reference signal mode information within the subframe and through the additional data resource elements indicated by the additional resource mode information.

2. The method according to claim 1,
wherein the reference signal mode information includes information indicating any one of:
a first mode for allocating the reference signal to all of the available reference signal resource elements;
a second mode for allocating the reference signal to part of the available reference signal resource elements;
a third mode for allocating the reference signal to resource elements except for resource elements for the second mode among the available reference signal resource elements; and
a fourth mode for not allocating the reference signal to all of the available reference signal resource elements.

3. The method according to claim 1,
wherein the additional resource mode information includes information indicating any one of:
a first mode for not allocating the additional data resource elements to all of the available reference signal resource elements;
a second mode for allocating the additional data resource elements to part of the available reference signal resource elements;
a third mode for allocating the additional data resource elements to resource elements except for resource elements for the second mode among the available reference signal resource elements; and
a fourth mode for allocating the additional data resource elements to all of the available reference signal resource elements.

4. The method according to claim 1,
wherein the sum of the resource elements on which the reference signal is transmitted according to the reference signal mode information and the additional data resource elements according to the additional resource mode information constitutes the available reference signal resource elements.

5. The method according to claim 1,
wherein the reference signal mode information is transmitted in every Transmit Time Interval (TTI).

6. The method according to claim 1,
wherein the reference signal mode information is transmitted in every Transmit Time Interval (TTI) of a reference value.

7. The method according to claim 1,
wherein the reference signal mode information is transmitted through a downlink control channel.

8. A User Equipment (UE) for receiving a signal from a Base Station (BS) in a wireless access system supporting Full Duplex Radio (FDR) transmission, the UE comprising:

a Radio Frequency (RF) unit configured to transmit and receive radio signals to and from the BS; and
a processor,
wherein the processor is configured to
receive, from the BS, reference signal mode information indicating resource elements on which a reference signal is transmitted among available reference signal resource elements allocated to transmit the reference signal,
receive additional resource mode information indicating additional data resource elements for transmitting data among the resource elements indicated by the reference signal mode information, and
receive the reference signal through the resource elements indicated by the reference signal mode information within a subframe and simultaneously transmit the data through resource elements excluding the resource elements indicated by the reference signal mode information within the subframe and through the additional data resource elements indicated by the additional resource mode information.

9. The UE according to claim 8,
wherein the reference signal mode information includes information indicating any one of:
a first mode for allocating the reference signal to all of the available reference signal resource elements;
a second mode for allocating the reference signal to part of the available reference signal resource elements;
a third mode for allocating the reference signal to resource elements except for resource elements for the second mode among the available reference signal resource elements; and
a fourth mode for not allocating the reference signal to all of the available reference signal resource elements.

10. The UE according to claim 8,
wherein the additional resource mode information includes information indicating any one of:
a first mode for not allocating the additional data resource elements to all of the available reference signal resource elements;
a second mode for allocating the additional data resource elements to part of the available reference signal resource elements;
a third mode for allocating the additional data resource elements to resource elements except for resource elements for the second mode among the available reference signal resource elements; and
a fourth mode for allocating the additional data resource elements to all of the available reference signal resource elements.

11. The UE according to claim 8,
wherein sum of the resource elements on which the reference signal is transmitted according to the reference signal mode information and the additional data resource elements according to the additional resource mode information constitutes the available reference signal resource elements.

12. The UE according to claim 8,
wherein the reference signal mode information is transmitted in every Transmit Time Interval (TTI).

13. The UE according to claim 8,
wherein the reference signal mode information is transmitted in every Transmit Time Interval (TTI) of a reference value.

14. The UE according to claim 8,
wherein the reference signal mode information is transmitted through a downlink control channel.

* * * * *